(12) United States Patent
Kochi et al.

(10) Patent No.: US 6,181,731 B1
(45) Date of Patent: Jan. 30, 2001

(54) SPREAD SPECTRUM COMMUNICATION DEVICE

(75) Inventors: Tetsuya Kochi, Mukoh; Fumio Kanaya, Nagaokakyo; Hiroaki Tanaka, Mishima-gun, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/020,738

(22) Filed: Feb. 9, 1998

(30) Foreign Application Priority Data

Feb. 7, 1997 (JP) .................................................... 9-025126

(51) Int. Cl.$^7$ .............................. H04L 27/30; H04B 1/10
(52) U.S. Cl. ......................... 375/144; 375/148; 375/346; 375/350
(58) Field of Search ..................................... 375/200, 206, 375/207, 346, 350, 130, 140, 143, 144, 148; 455/307, 308, 296; 327/551, 552

(56) References Cited

U.S. PATENT DOCUMENTS

| | | | | |
|---|---|---|---|---|
| 4,613,978 | * | 9/1986 | Kurth et al. ......................... | 375/346 |
| 5,467,368 | * | 11/1995 | Takeuchi ............................. | 375/206 |
| 5,564,095 | * | 10/1996 | Arnstein et al. ..................... | 455/296 |
| 5,844,936 | * | 12/1998 | Lesthievent ......................... | 375/206 |
| 5,930,287 | * | 7/1999 | Kochi et al. ........................ | 375/200 |

* cited by examiner

Primary Examiner—Stephen Chin
Assistant Examiner—Betsy L. Deppe
(74) Attorney, Agent, or Firm—Ostrolenk, Faber, Gerb & Soffen, LLP (57) ABSTRACT

The invention provides a small-sized low-cost spread spectrum communication device including a narrow-band interference signal elimination circuit capable of covering all the frequency band of a spread signal. A spread signal is received by an antenna and supplied to a level detection circuit via a variable amplifier and a divider. The level detection circuit controls the variable amplifier so that the spread signal is amplified to a fixed level. The signal containing a narrow-band interfering signal is then passed through a plurality of magnetostatic filters connected in series such that the saturation level thereof successively decreases, thereby limiting the narrow-band interfering signal having a level greater than the level of the spread signal in a step-by-step fashion. Thus, the narrow-band interfering signal contained in the spread signal is limited to a low level without encountering a significantly large incidental reduction in the spread signal. The narrow-band interference signal elimination circuit according to the invention may be realized in the form of a small size.

16 Claims, 10 Drawing Sheets

SPREAD SPECTRUM COMMUNICATION DEVICE

BACKGROUND OF THE INVENTION

1. Field of the Invention

The present invention relates to a spread spectrum communication device, and more particularly to a spread spectrum communication device having the capability of removing a narrow-band interfering signal present in a frequency band of a spread signal.

2. Description of the Related Art

Figure 12:
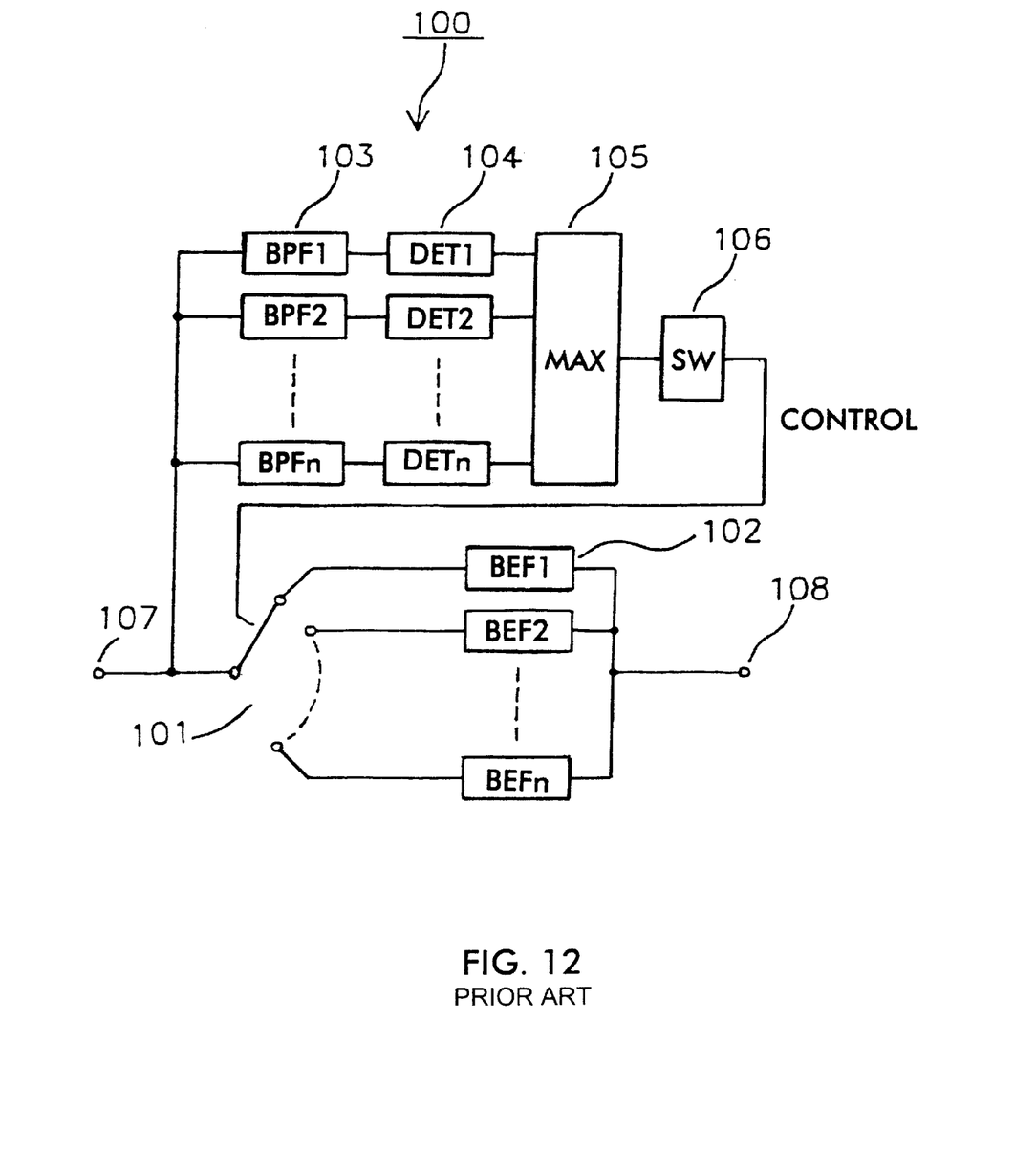
FIG. 12 is a block diagram illustrating the construction of a narrow-band interference signal elimination circuit used in a spread spectrum communication device according to a conventional technique.

FIG. 12 illustrates an example of a narrow-band interference signal elimination circuit used in a conventional spread spectrum communication device.

As shown in FIG. 12, the narrow-band interference signal elimination circuit 100 comprises a switch 101, a band-rejection filter 102, a bandpass filter 103, a detector 104, a maximum level detection circuit 105, a switch control circuit 106, an input signal terminal 107, and an output signal terminal 108. The bandpass filter 103 comprises a plurality of filters BPF1, BPF2, . . . , BPFn. The input of each of these filters is connected to the input signal terminal 107, and the output of each of these filters is connected to the maximum level detection circuit 105 via the corresponding one of the detectors DFT1, DFT2, . . . , DFTn. The output of the maximum level detection circuit 105 is connected to the switch 101 via the switch control circuit 106. The input terminal of the switch 101 is connected to the input signal terminal 107. The switch 101 has a plurality of output terminals which are connected to the filters BEF1, BEF2, . . . , BEFn, respectively, of the band-rejection filter 102. The outputs of the filters BEF1, BEF2, . . . , BEFn are combined together and connected to the output signal terminal 108. The band-rejection filter 102, the bandpass filter 103, and the detector 104 are each include an equal number of elements.

In the narrow-band interference signal elimination circuit 100, the frequency bands of the respective filter elements of the band-rejection filter 102 and those of the respective filter elements of the bandpass filter 103 correspond to the frequency subbands used in the spread spectrum communication. When a signal is input to the input signal terminal 107, the input signal is applied to the switch 101 and also to the detector 104 via the bandpass filter 103. The detector 104 detects the signal level for each frequency band. The maximum level detection circuit 105 evaluates the signals output from the respective elements of the detector 104, and determines the frequency band having a maximum signal level. The maximum level detection circuit 105 operates the switch 101 via the switch control circuit 106 so that the input signal is coupled to a band-rejection filter element having a frequency band corresponding to that of the bandpass filter element regarded as having the maximum signal level and thus the input signal components except for the signal component corresponding to the frequency band of the selected band-rejection filter element are output via the output signal terminal 108. When a narrow-band interfering signal is present within a communication frequency band, the signal component having a frequency band including the frequency of the interfering signal is removed by the narrow-band interference signal elimination circuit 100 described above.

The narrow-band interference signal elimination circuit 100 described above has a problem that a great number of bandpass filter elements and band-rejection filter elements are required, and thus a large installation area for them is required. This causes an increase in cost. Another problem is that when there are two or more narrow-band interfering signals having different frequencies, only one narrow-band interfering signal having the highest signal level is removed.

Thus it is an object of the present invention to provide a small-sized low-cost spread spectrum communication device having a narrow-band interference signal elimination circuit capable of covering all spread signal frequency bands.

SUMMARY OF THE INVENTION

According to an aspect of the invention, to achieve the above object, there is provided a spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in the frequency domain, the spread spectrum communication device being characterized in that the narrow-band interference signal elimination circuit limits the narrow-band interfering signal a plurality of times so as to successively limit the level in the frequency domain.

In a preferable mode of the spread spectrum communication device, the narrow-band interference signal elimination circuit includes a magnetostatic filter for limiting the level of a signal whose level in the frequency domain is higher than a predetermined level.

In another preferable mode of the spread spectrum communication device, the narrow-band interference signal elimination circuit includes: a plurality of magnetostatic filters connected in series in such a manner that the saturation level thereof decreases with the position of the magnetostatic filters in the series connection; and a variable amplifier for amplifying the level of the spread signal input to the plurality of magnetostatic filters.

In still another preferable mode of the spread spectrum communication device, the narrow-band interference signal elimination circuit includes: a plurality of magnetostatic filters connected in series; a plurality of amplifiers respectively disposed between adjacent magnetostatic filters; and a variable amplifier for amplifying the level of the spread signal input to the plurality of magnetostatic filters.

In still another preferable mode of the spread spectrum communication device, the narrow-band interference signal elimination circuit includes: a plurality of magnetostatic filters connected in series; a plurality of variable amplifiers each disposed at an input of a the respective one of the magnetostatic filters; a level detection circuit for detecting the level of the spread signal and also the maximum level of the narrow-band interfering signal contained in the spread signal; and an amplification factor control circuit connected to the level detection circuit and serving to control the amplification factor of the plurality of variable amplifiers.

According to another aspect of the invention, there is provided a spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in the frequency domain, the spread spectrum communication device being characterized in that: the narrow-band inference signal elimination circuit includes: a gradient saturation magnetostatic filter whose saturation level decreases with the propagation of the signal; and a variable amplifier for amplifying the level of the spread signal input to the gradient saturation magnetostatic filter.

With the spread spectrum communication device constructed in the above-described manner according to the invention, when the spread signal includes a narrow-band interfering signal having a level in the frequency domain higher than the predetermined value, the level of the narrow-band interfering signal is limited to a predetermined value.

Other features and advantages of the present invention will become apparent from the following description of the invention which refers to the accompanying drawings.

BRIEF DESCRIPTION OF THE DRAWINGS

FIGS. 2(a)–2(e) illustrate the spectrum of a signal for various blocks of the spread spectrum communication device according to the embodiment shown in FIG. 1, wherein

FIGS. 4(a)–4(g) illustrate the spectrum of a signal for various blocks of the spread spectrum communication device according to the embodiment shown in FIG. 3, wherein

FIGS. 6(a)–6(g) illustrate the spectrum of a signal for various blocks of the spread spectrum communication device according to the embodiment shown in FIG. 3, wherein

FIGS. 11(a)–11(c) illustrate the spectrum of a signal for various blocks of the spread spectrum communication device according to the embodiment shown in FIG. 7, wherein

DESCRIPTION OF THE PREFERRED EMBODIMENTS

An embodiment of a spread spectrum communication device according to the present invention is described below with reference to FIG. 1. The spread spectrum communication device 1 comprises an antenna 2 for receiving a spread signal, a bandpass filter 3, an amplifier 4, a narrow-band interference signal elimination circuit 5 for removing interference from the spread signal, a local oscillator 6, and a mixer 7. The narrow-band interference signal elimination circuit 5 comprises a variable amplifier 8, a divider 9, a level detection circuit 10, and magnetostatic filters 11, 12, and 13.

The antenna 2 is connected to the mixer 7 via the bandpass filter 3, the amplifier 4, and the narrow-band interference signal elimination circuit 5. The mixer 7 is also connected to the local oscillator 6. The output of the mixer 7 is connected to a demodulator (not shown). In the narrow-band interference signal elimination circuit 5, the input is connected to the divider 9 via the variable amplifier 8. One of the outputs of the divider 9 is connected to the output terminal via the three magnetostatic filters 11, 12 and 13, and the other output is connected to the variable amplifier 8 via the level detection circuit 10.

The operation of the spread spectrum communication device 1 is described below with reference to FIGS. 1 and FIGS. 2(a)–2(e). FIGS. 2(a)–2(e) illustrate spectra of the spread signal and the narrow-band interfering signal contained in the spread signal at various positions in the spread spectrum communication device 1.

Figure 1:
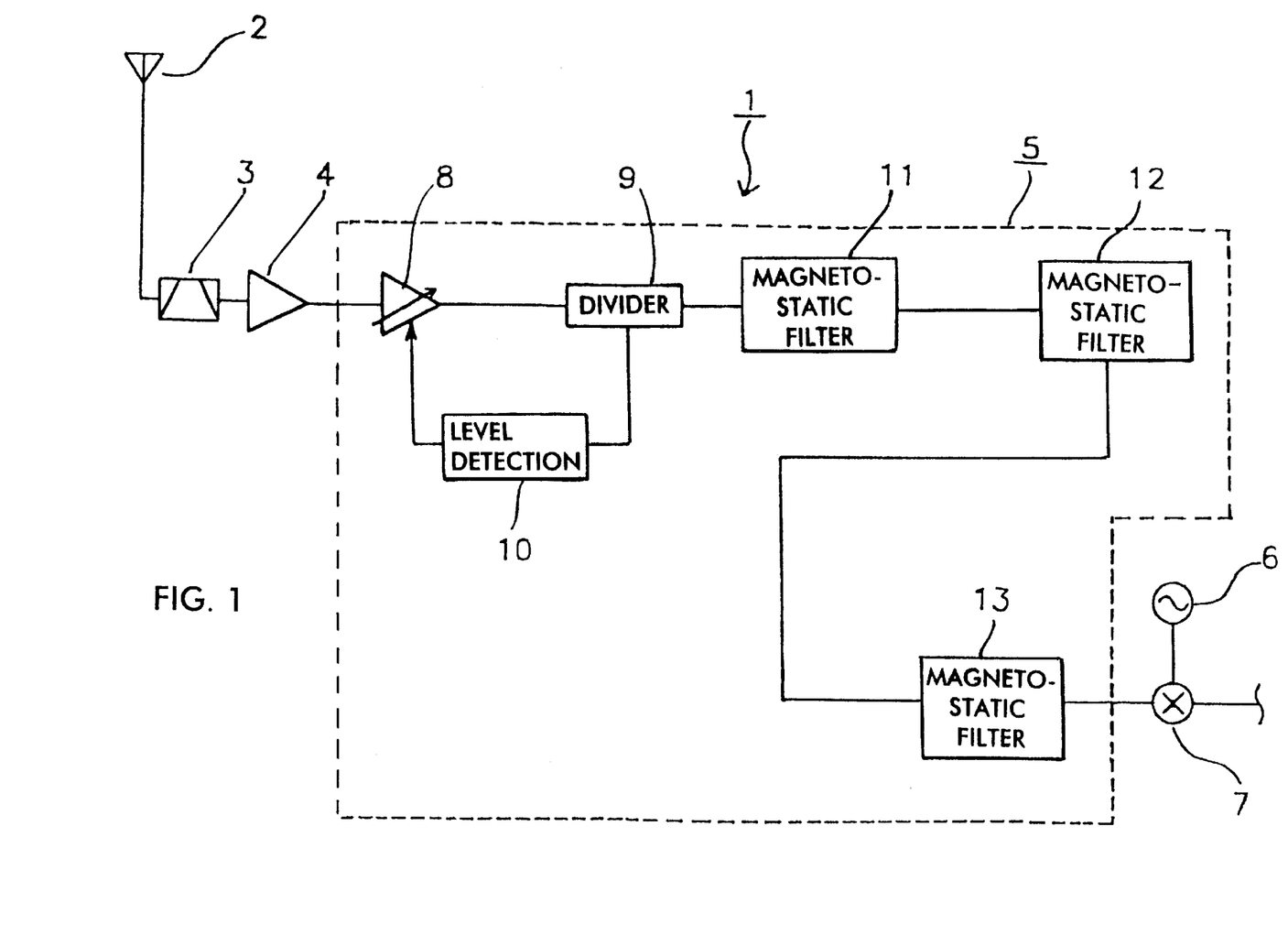
FIG. 1 is a block diagram illustrating the construction of a spread spectrum communication device according to an embodiment of the present invention.

Referring to FIG. 1, the spread signal including a narrow-band interfering signal received by the antenna 2 is applied to the bandpass filter 3 so as to remove unnecessary frequency components. The signal is amplified by the amplifier 4 by a fixed amplification factor. The output of the amplifier 4 is applied to the narrow-band interference signal elimination circuit 5.

Figure 2A:
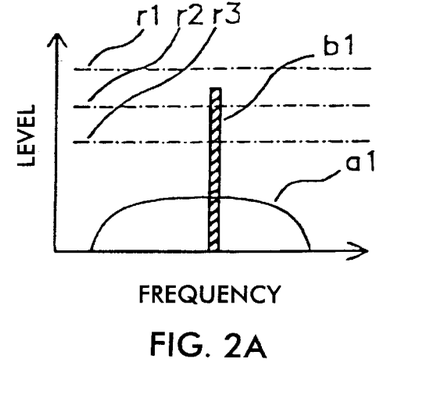
FIG. 2(a) illustrates the signal input to the narrow-band interference signal elimination circuit 5.

FIG. 2(a) illustrates the spectrum of the signal applied to the narrow-band interference signal elimination circuit 5. In FIGS. 2(a)–2(e), r1, r2, and r3 denote the saturation levels of the magnetostatic filters 11, 12, and 13, respectively.

The signal includes a spread signal al and also a narrow-band interfering signal b1 having a signal level higher than that of the spread signal al. The ratio of the power of the interference to the power of the spread signal may vary.

Figure 2B:
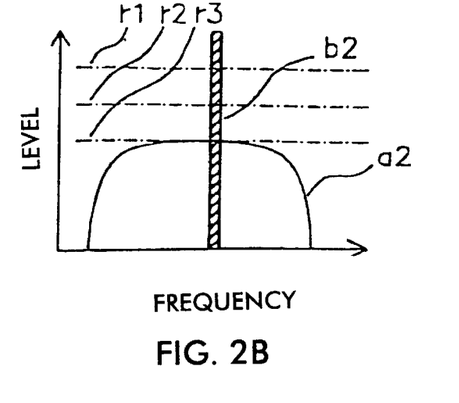
FIG. 2(b) illustrates the signal input to the magnetostatic filter 11.

The signal is amplified by the variable amplifier 8, and further the signal is divided by the divider 9 into two signals, one of which is applied to the magnetostatic filter 11 and the other is applied to the level detection circuit 10. The level detection circuit 10 detects the level of the spread signal, and controls the variable amplifier 8 so that the level of the spread signal applied to the magnetostatic filter 11 is maintained at a fixed level as shown in FIG. 2(b). The amplification factor of the variable amplifier 8 is controlled so that the spread signal a2 output from the variable amplifier 8 has a level which is lower than the saturation level r1 of the magnetostatic filter 11. The narrow-band interfering signal b2 is also amplified by the same amplification factor, and the signal level of narrow-band interfering signal b2 becomes greater than the saturation level r1.

Figure 2C:
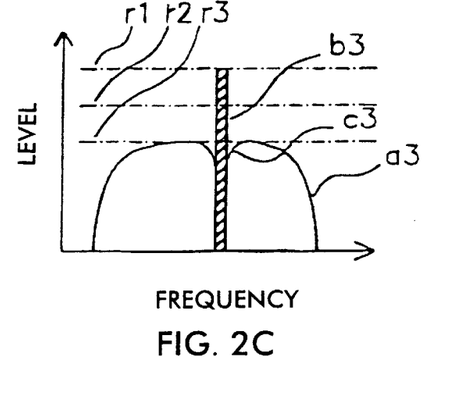
FIG. 2(c) illustrates the signal input to the magnetostatic filter 12.

When the signal applied to the magnetostatic filter 11 includes a component having a level higher than the saturation level r1, the magnetostatic filter 11 limits the level of such a component to the saturation level r1. FIG. 2(c) illustrates the spectrum of the signal output by the magnetostatic filter 11. As can be seen in FIG. 2(c), the portion of the narrow-band interfering signal b3 higher in level than the saturation level r1 is cut off by the magnetostatic filter 11.

An incidental reduction c3 in the spread signal a3 occurs when the excess power of the narrow-band interfering signal b3 is cut off. The incidental reduction refers to a reduction in the signal level which occurs at frequencies near the band for which the above power level reduction is performed by the magnetostatic filter. The incidental reduction increases with the amount of interference power reduced by the filter.

Accordingly, it is preferable to limit the interference gradually. In other words, it is preferable to divide interference reduction process into two or more. In one of the processes, relatively little amount of interference is reduced, thereby reduction of spread signal can be small through the processes. As a result, interference can be removed from the spread signal with little amount of incidental reduction.

In FIG. 2(c), although the narrow-band interfering signal b3 has a high power level before being subjected to the limitation in the power level, the incidental reduction is small because the power level of the narrow-band interfering signal b3 is higher than the saturation level r1 by a small amount.

Figure 2D:
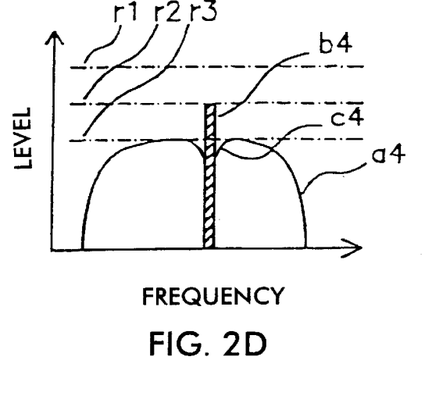
FIG. 2(d) illustrates the signal input to the magnetostatic filter 13.

The signal output from the magnetostatic filter 11 is input to the magnetostatic filter 12. If the signal applied to the magnetostatic filter 12 includes a component in the frequency domain having a level higher than the saturation level r2, the magnetostatic filter 12 reduces the level of such a component to the saturation level r2. FIG. 2(d) illustrates the spectrum of the signal output by the magnetostatic filter 12. As can be seen in FIG. 2(d), the portion of the narrow-band interfering signal b4 higher in level than the saturation level r2 is cut off by the magnetostatic filter 12.

In the above operation, an incidental reduction c4 occurs in the spread signal a4. However the incidental reduction c4 is small enough because the amount of the reduction of the power level of the narrow-band interfering signal b4 performed by the magnetostatic filter 12 is smaller than the amount of the power reduction performed by the magnetostatic filter 11.

Figure 2E:
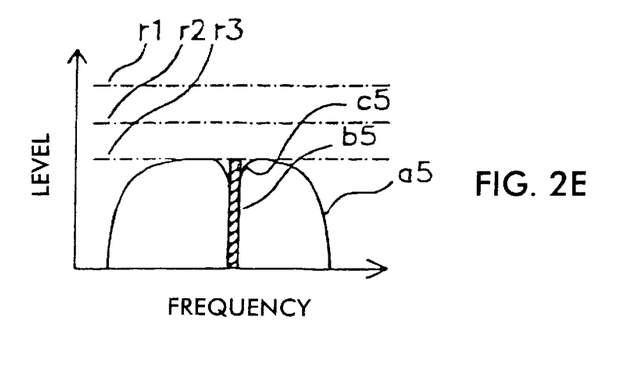
FIG. 2(e) illustrates the signal output from the magnetostatic filter 11.

The signal output from the magnetostatic filter 12 is input to the magnetostatic filter 13. If the signal includes a component in the frequency domain having a level higher than the saturation level r3, the level of such a component is reduced to the saturation level r3. FIG. 2(e) illustrates the spectrum of the signal output from the magnetostatic filter 13. As shown in FIG. 2(e), the portion of the narrow-band interfering signal b5 higher in level than the saturation level r3 is cut off by the magnetostatic filter 13 so that the resultant level of the narrow-band interfering signal b5 becomes equal to the level of the spread signal a5.

In the above operation, an incidental reduction c5 occurs in the spread signal a5. However, the incidental reduction c5 is small enough, because the amount of the reduction in the power level of the narrow-band interfering signal b5 performed by the magnetostatic filter 13 is further lower than the amount of the power reduction performed by the magnetostatic filter 12.

The output of the magnetostatic filter 13 is applied to the mixer 7. The mixer 7 converts the received signal to a signal having a frequency equal to the difference between the original frequency and the frequency of the local signal supplied from a local oscillator 6. The converted signal is supplied to a demodulator (not shown).

In the spread spectrum communication device 1 having the structure described above, the saturation levels r1, r2 and r3 of the three magnetostatic filters 11, 12 and 13 are set to values decreasing in the order from r1 to r3 so that the narrow-band interfering signal is finally suppressed to a level equal to the level of the spread signal.

As described above, it is possible to limit the narrow-band interfering signal contained in the spread signal to a particular level while maintaining the incidental reduction to a sufficiently low degree, thereby achieving an improvement in the signal-to-noise ratio associated with the demodulated signal. Furthermore, it is possible to limit the narrow-band interfering signal across the entire frequency band of the spread signal using only one magnetostatic filter, and thus it is possible to realize a small-sized narrow-band interference signal elimination circuit.

In the specific embodiment described above with reference to FIG. 1, three magnetostatic filters are employed. However, the advantages and features of the invention may also be achieved by employing two or more magnetostatic filters. Furthermore, although in the above embodiment, the level of the narrow-band interfering signal is limited to the same value as the level of the spread signal, it may also be limited to a value higher or lower than the level of the spread signal.

Figure 3:
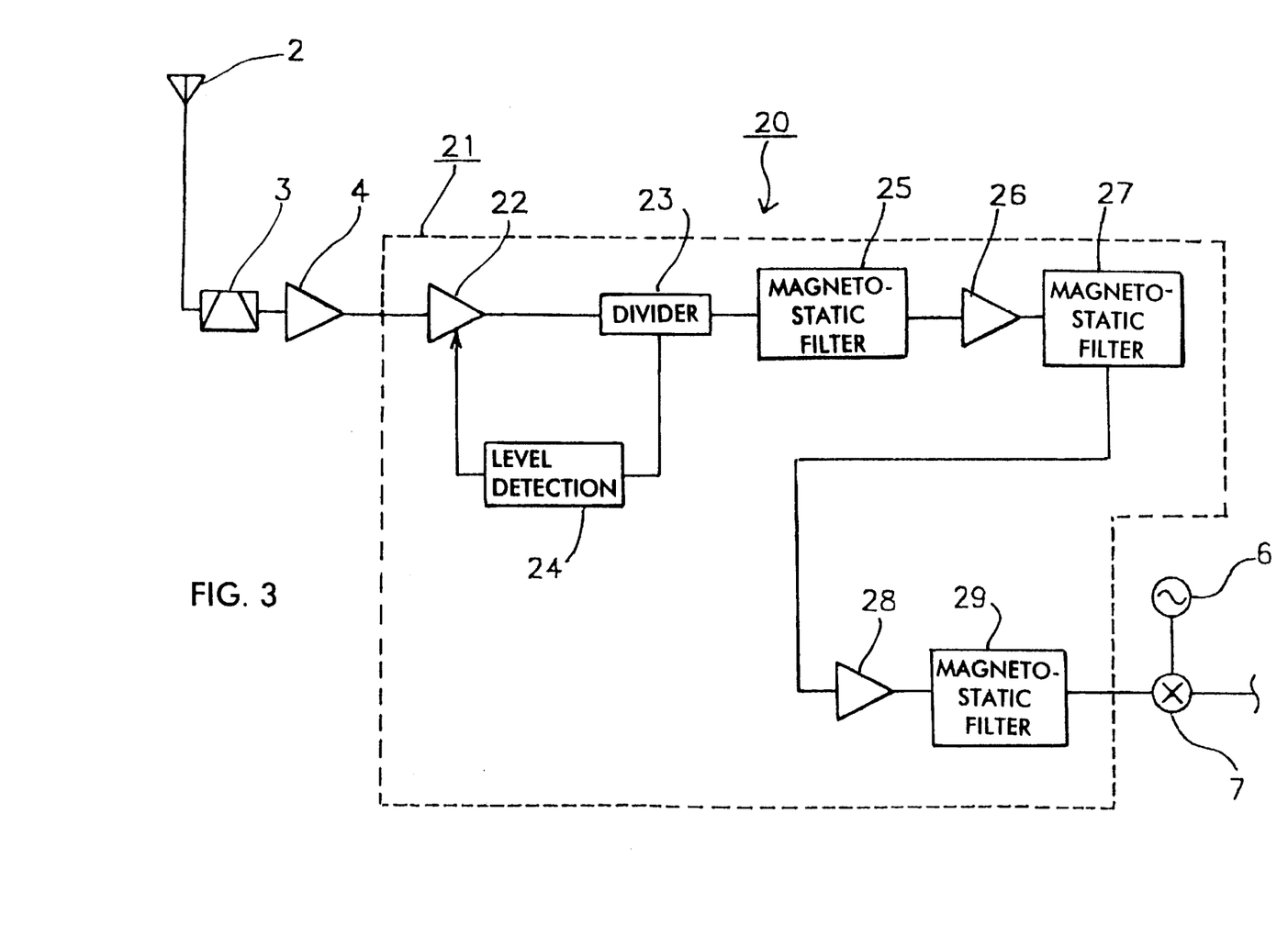
FIG. 3 is a block diagram illustrating the construction of a spread spectrum communication device according to another embodiment of the present invention.

FIG. 3 illustrates another embodiment of a spread spectrum communication device according to the present invention. In FIG. 3, elements similar or equivalent to those in the embodiment shown in FIG. 1 are denoted by similar reference numerals, and they are not described in further detail here. In the spread spectrum communication device 20 shown in FIG. 3, a narrow-band interference signal elimination circuit 21 comprises a variable amplifier 22, a divider 23, a level detection circuit 24, magnetostatic filters 25, 27, and 29, and amplifiers 26 and 28.

In the narrow-band interference signal elimination circuit 21, the input is connected to the divider 23 via the variable amplifier 22. One of the outputs of the divider 23 is connected to the output terminal via the magnetostatic filter 25, the amplifier 26, the magnetostatic filter 27, the amplifier 28, and the magnetostatic filter 29, while the other output is connected to the variable amplifier 22 via the level detection circuit 24.

The operation of the spread spectrum communication device 20 is described below referring to FIG. 3 and FIGS. 4(a)–4(g). FIGS. 4(a)–4(g) illustrate the spectrum of the spread signal and also that of the narrow-band interfering signal contained in the spread signal for various blocks of the spread spectrum communication device 20.

In FIG. 3, the spread signal received via the antenna 2 and containing the narrow-band interfering signal is applied to the bandpass filter 3 so as to remove unnecessary frequency components. The resultant signal is amplified by the amplifier 4 by a fixed amplification factor, and then applied to the narrow-band interference signal elimination circuit 21. FIG.

4(a) illustrates the spectrum of the signal input to the narrow-band interference signal elimination circuit 21. As can be seen, the signal applied to the narrow-band interference signal elimination circuit 21 includes a spread signal f1 having a frequency component spread across a wide frequency band and also a narrow-band interfering signal g1 having a signal level higher than that of the spread signal f1 and having a frequency component within the same frequency band. In FIGS. 4(a)–4(g), r4, r5 and r6 denote the saturation levels of the magnetostatic filters 25, 27 and 29, respectively.

Figure 4A:
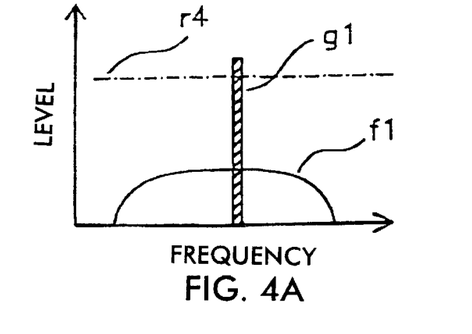
FIG. 4(a) illustrates the signal input to the narrow-band interference signal elimination circuit 21.
Figure 4B:
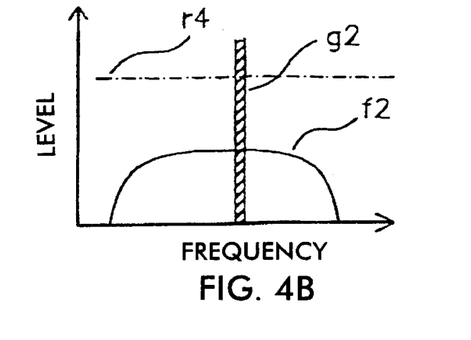
FIG. 4(b) illustrates the signal input to the magnetostatic filter 25.

The signal input to the narrow-band interference signal elimination circuit 21 is amplified by the variable amplifier 22, and the resultant signal is divided by the divider 23 into two signals one of which is applied to the magnetostatic filter 25 and the other is applied to the level detection circuit 24. The level detection circuit 24 detects the level of the spread signal from the input signal, and controls the variable amplifier 22 so that the level of the spread signal input to the magnetostatic filter 25 becomes different by a fixed amount from the saturation level of the magnetostatic filter 25. FIG. 4(b) illustrates the spectrum of the signal input to the magnetostatic filter 25. That is, the amplification factor of the variable amplifier 22 is controlled so that the spread signal f2 has a particular level lower by a predetermined amount than the saturation level r4 of the magnetostatic filter 25. The narrow-band interfering signal g2 contained in the spread signal f2 is also amplified by the same amplification factor, and thus the signal level thereof becomes greater than the saturation level r4 of the magnetostatic filter 25.

Figure 4C:
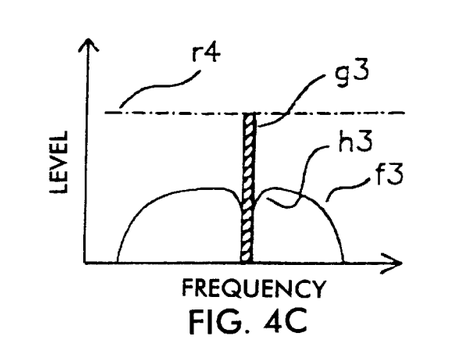
FIG. 4(c) illustrates the signal output from the magnetostatic filter 25.

In the magnetostatic filter 25, a signal with a level in the frequency domain higher than saturation level r4 is limited to the saturation level r4. FIG. 4(c) illustrates the spectrum of the signal output from the magnetostatic filter 25. As can be seen, the portion of the narrow-band interfering signal g3 higher in level than the saturation level r4 is cut off by the magnetostatic filter 25.

In the above operation, an incidental reduction h3 occurs in the spread signal f3. However, the incidental reduction h3 is small enough because there is a great difference between the saturation level r4 of the magnetostatic filter 25 and the level of the spread signal f3 although the narrow-band interfering signal g3 has a large power level before being limited in the power level.

Figure 4D:
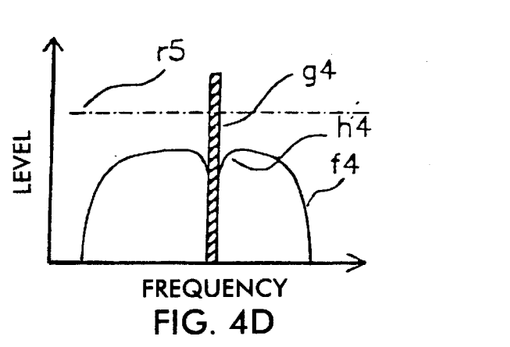
FIG. 4(d) illustrates the signal output from the amplifier 26.

The signal output from the magnetostatic filter 25 is applied to the amplifier 26 and amplified by a fixed factor. FIG. 4(d) illustrates the spectrum of the signal output from the amplifier 26. As shown in FIG. 4(d), the spread signal f4 is amplified to a level different by a predetermined amount from the saturation level r5 of the magnetostatic filter 27. This difference in the level is set so that it becomes smaller than the difference between the spread signal input to the magnetostatic filter 25 and the saturation level of the magnetostatic filter 25.

Figure 4E:
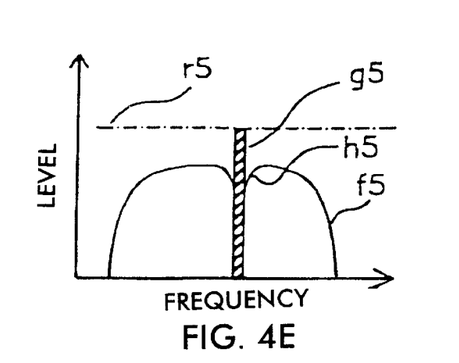
FIG. 4(e) illustrates the signal output from the magnetostatic filter 27.

The signal output from the amplifier 26 is input to the magnetostatic filter 27. If the signal includes a component in the frequency domain higher than the saturation level r5, such a component is reduced to a level equal to the saturation level r5. FIG. 4(e) illustrates the spectrum of the signal output from the magnetostatic filter 27. As can be seen, the portion of the narrow-band interfering signal f5 higher in level than the saturation level r5 is cut off by the magnetostatic filter 27.

In the above operation, an incidental reduction h5 occurs in the spread signal f5. However the incidental reduction h5 is small enough, because the amount of the reduction in the power level of the narrow-band interfering signal g5 performed by the magnetostatic filter 27 is smaller than the amount of the reduction performed by the magnetostatic filter 25 and because there is still a difference between the saturation level r5 of the magnetostatic filter 27 and the level of the spread signal f5.

Figure 4F:
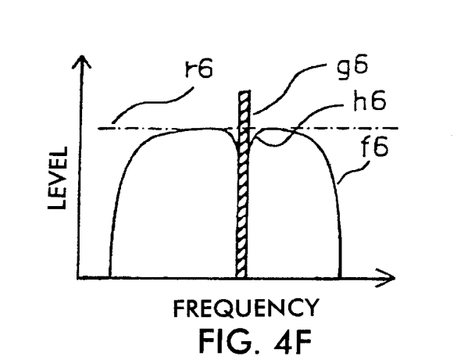
FIG. 4(f) illustrates the signal output from the amplifier 28.

The signal output from the magnetostatic filter 27 is input to the amplifier 28 and amplified. FIG. 4(f) illustrates the spectrum of the signal output from the amplifier 28. As can be seen, the spread signal f6 is amplified to a level equal to the saturation level r6 of the magnetostatic filter 29.

Figure 4G:
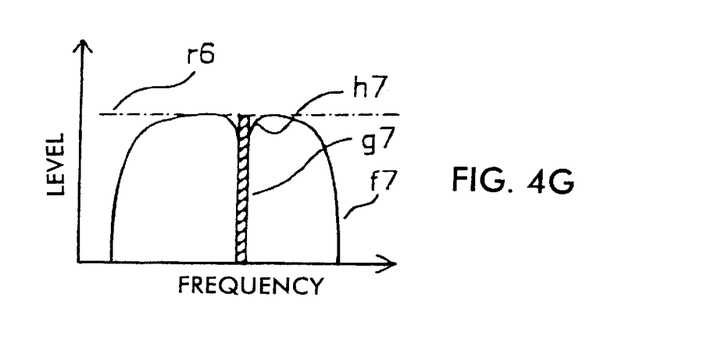
FIG. 4(g) illustrates the signal output from the magnetostatic filter 29.

The signal output from the amplifier 28 is input to the magnetostatic filter 29. If the signal includes a component in the frequency domain higher than the saturation level r6, such a component is reduced to a level equal to the saturation level r6. FIG. 4(g) illustrates the spectrum of the signal output from the magnetostatic filter 29. As can be seen, the portion of the narrow-band interfering signal g7 higher in level than the saturation level r6 is cut off by the magnetostatic filter 29 so that the resultant level of the narrow-band interfering signal g7 becomes equal to the level of the spread signal f7.

In the above operation, an incidental reduction h7 occurs in the spread signal f7. However, the incidental reduction h7 is small enough, because the amount of the power level reduction of the narrow-band interfering signal g7 performed by the magnetostatic filter 29 is further smaller than the amount of the power level reduction performed the magnetostatic filter 27.

The output of the magnetostatic filter 29 is applied to the mixer 7. The mixer 7 converts the received signal to a signal having a frequency equal to the difference between the original frequency and the frequency of the local signal supplied from a local oscillator 6. The converted signal is supplied to a demodulator (not shown).

In the spectrum spread equipment 20 having the structure described above, the saturation levels r4, r5, and r6 of three magnetostatic filters 25, 27 and 29 and the amplification factors of two amplifiers 26 and 28 are selected so that the level of the narrow-band interfering signal finally becomes equal to the level of the spread signal. However, in the present embodiment, unlike the narrow-band interference signal elimination circuit 5 according to the embodiment described above with reference to FIG. 1, the saturation levels of the two magnetostatic filters 27 and 29 may be set to arbitrary values by properly adjusting the amplification factors of the two amplifiers 26 and 28. Therefore, for example, the saturation levels of the three magnetostatic filters 25, 27, and 29 may be set to an equal value.

As described above, the level of the narrow-band interfering signal contained in the spread signal can be suppressed without encountering a significantly great incidental reduction in the spread signal. Thus, it is possible to improve the signal-to-noise ratio associated with the demodulated signal. Furthermore, it is possible to limit the narrow-band interfering signal across the entire frequency band of the spread signal using only one magnetostatic filter, and thus it is possible to realize a small-sized narrow-band interference signal elimination circuit.

In the specific embodiment described above with reference to FIG. 3, three magnetostatic filters are employed. However, the advantages and features of the invention may also be achieved by employing two or more magnetostatic filters. Furthermore, although in the above embodiment, the level of the narrow-band interfering signal is limited to the same value as the level of the spread signal, it may also be limited to a value higher or lower than the level of the spread signal.

Figure 5:
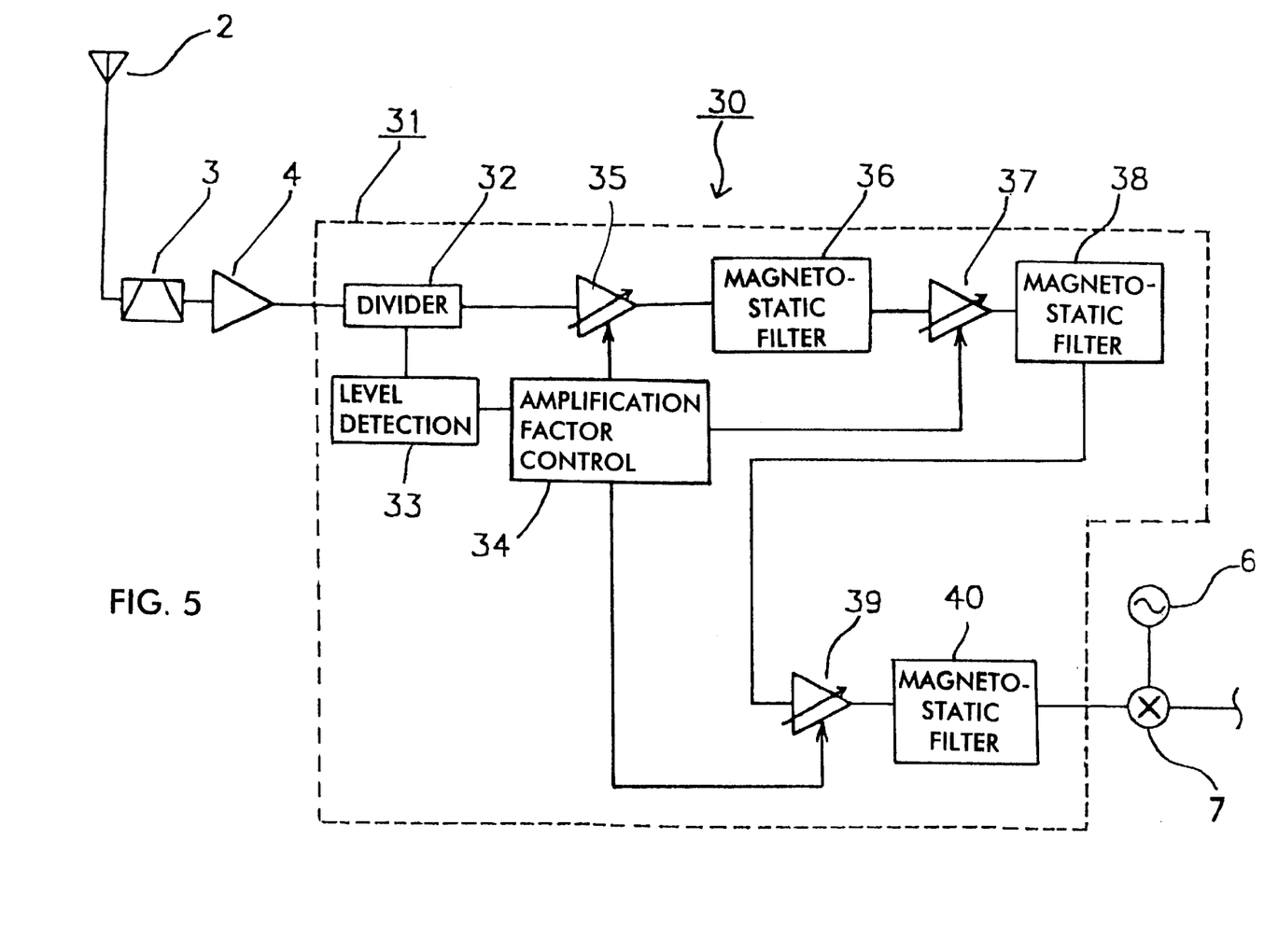
FIG. 5 is a block diagram illustrating the construction of a spread spectrum communication device according to still another embodiment of the present invention.

FIG. 5 illustrates still another embodiment of a spread spectrum communication device according to the present invention. In FIG. 5, elements similar or equivalent to those in the embodiment shown in FIG. 1 are denoted by similar reference numerals, and they are not described in further detail here. In the spread spectrum communication device 30 shown in FIG. 5, a narrow-band interference signal elimination circuit 31 comprises a divider 32, a level detection circuit 33, an amplification factor control circuit 34, variable amplifiers 35, 37, and 39, and magnetostatic filters 36, 38 and 40.

In the narrow-band interference signal elimination circuit 31, the input is applied to the divider 32. One of the outputs of the divider 32 is connected to the output terminal via the variable amplifier 35, the magnetostatic filter 36, the variable amplifier 37, the magnetostatic filter 38, the variable amplifier 39, and the magnetostatic filter 40, while the other output is connected to the amplification factor control circuit 34 via the level detection circuit 33. The amplification factor control circuit 34 is connected to the variable amplifiers 35, 37, and 39.

The operation of the spread spectrum communication device 30 is described below referring to FIGS. 5 and 6(a)–6(g). FIGS. 6(a)–6(g) illustrate the spectrum of the spread signal and also the spectrum of the narrow-band interfering signal contained in the spread signal, for various blocks of the spread spectrum communication device 30.

Figure 6A:
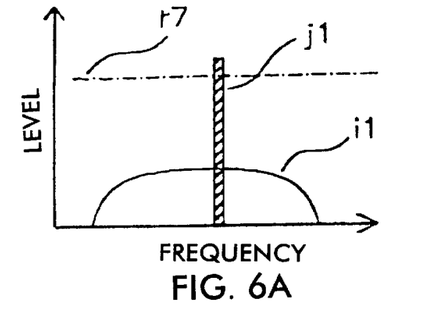
FIG. 6(a) illustrates the signal input to the narrow-band interference signal elimination circuit 31.
Figure 6B:
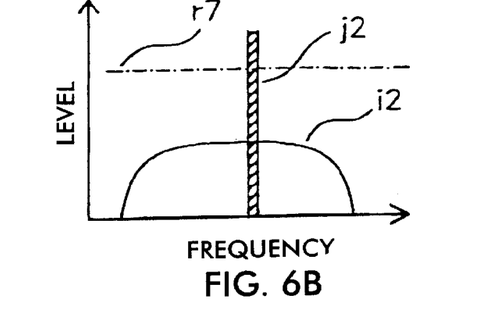
FIG. 6(b) illustrates the signal input to the magnetostatic filter 36.

In FIG. 5, the spread signal received via the antenna 2 and containing the narrow-band interfering signal is applied to the bandpass filter 3 so as to remove unnecessary frequency components. The resultant signal is amplified by the amplifier 4 by a fixed amplification factor, and then applied to the narrow-band interference signal elimination circuit 31. FIG. 6(a) illustrates the spectrum of the signal input to the narrow-band interference signal elimination circuit 31. As shown in FIG. 6(a), the signal applied to the signal input to the narrow-band interference signal elimination circuit 31 includes a spread signal i1 having a frequency component spread across a wide frequency band and also a narrow-band interfering signal j1 having a signal level higher than that of the spread signal i1 and having a frequency component within the same frequency band. In FIGS. 6(a)–6(g), r7, r8 and r9 denote the saturation level of the magnetostatic filters 36, 38 and 40, respectively.

The signal input to the narrow-band interference signal elimination circuit 31 is divided by the divider 32 into two signals, one of which is supplied to the variable amplifier 35 and the other is supplied to the level detection circuit 33. The level detection circuit 33 evaluates the received signal and detects the level of the spread signal and the maximum level of the narrow-band interfering signal. The result is applied to the amplification factor control circuit 34. From the level of the spread signal and the maximum level of the narrow-band interfering signal, the amplification factor control circuit 34 calculates the levels to which the narrow-band interfering signal should be limited by the respective magnetostatic filters and also calculates the amplification factors of the respective variable amplifiers required to achieve the these limitations. According to the calculation result, the amplification factor control circuit 34 controls the variable amplifiers 35, 37, and 39.

Thus, the narrow-band interfering signal is limited in level by the respective magnetostatic filters 36, 38, and 40. As can be seen from FIG. 6(b), the amplification factor of the variable amplifier 35 is controlled so that the difference in level between the narrow-band interfering signal j2 and the saturation level r7 of the magnetostatic filter 36 becomes equal to about one third of the difference in level between the narrow-band interfering signal j2 and the spread signal i2.

Figure 6C:
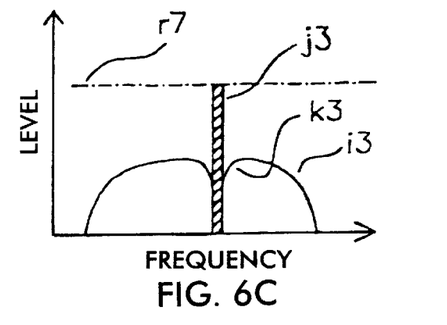
FIG. 6(c) illustrates the signal output from the magnetostatic filter 36.

If the signal input to the magnetostatic filter 36 includes a component in the frequency domain higher than the saturation level r7, such a component is reduced to the saturation level r7. FIG. 6(c) illustrates the spectrum of the signal output from the magnetostatic filter 36. As can be seen, the portion of the narrow-band interfering signal j3 higher in level than the saturation level r7 is cut off by the magnetostatic filter 36.

In the above operation, an incidental reduction k3 occurs in the spread signal i3. However, the incidental reduction k3 is small enough because the amount of the reduction performed by the magnetostatic filter 36 from the original level of the narrow-band interfering signal to the saturation level r7 is small although the power level of the original narrow-band interfering signal is high.

Figure 6D:
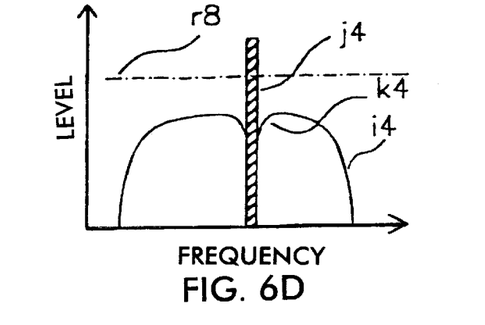
FIG. 6(d) illustrates the signal output from the variable amplifier 37.

The signal output from the magnetostatic filter 36 is applied to the variable amplifier 37 and amplified. FIG. 6(d) illustrates the spectrum of the signal output from variable amplifier 37. As can be seen from FIG. 6d, the amplification factor of the variable amplifier 37 is controlled so that the difference in level between the narrow-band interfering signal j4 and the saturation level r8 of the magnetostatic filter 38 becomes equal to about one half of the difference in level between the narrow-band interfering signal j4 and the spread signal i4.

Figure 6E:
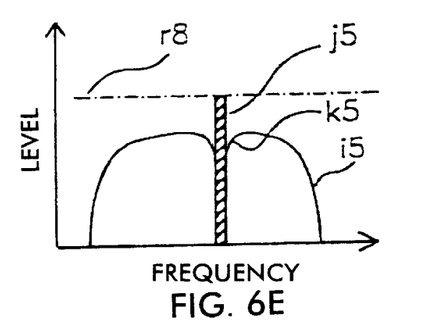
FIG. 6(e) illustrates the signal output from the magnetostatic filter 38.

The signal output from the variable amplifier 37 is applied to the magnetostatic filter 38. If the signal includes a component whose level in the frequency domain is higher than the saturation level r8, such a component is reduced to a level equal to the saturation level r8. FIG. 6(e) illustrates the spectrum of the signal output from the magnetostatic filter 38. As can be seen, the higher portion of the narrow-band interfering signal j5 than the saturation level r8 is cut off by the magnetostatic filter 38.

In the above operation, an incidental reduction k5 occurs in the spread signal i5. However, the incidental reduction k5 is small enough because the amount of the power level reduction of the narrow-band interfering signal j5 performed by the magnetostatic filter 38 is smaller than the amount of the power level reduction performed by the magnetostatic filter 36.

Figure 6F:
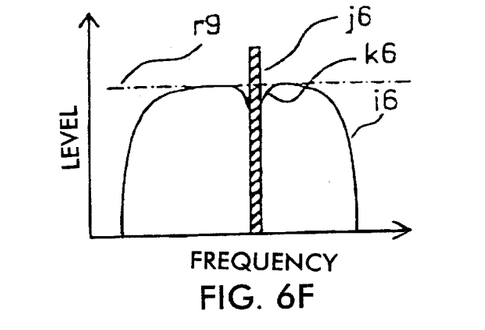
FIG. 6(f) illustrates the signal output from the variable amplifier 39.

The signal output from the magnetostatic filter 38 is applied to the variable amplifier 39 and amplified. FIG. 6(f) illustrate the spectrum of the signal output from the amplifier 39. As shown in FIG. 6(f), the spread signal i6 is amplified to a level equal to the saturation level r9 of the magnetostatic filter 40.

Figure 6G:
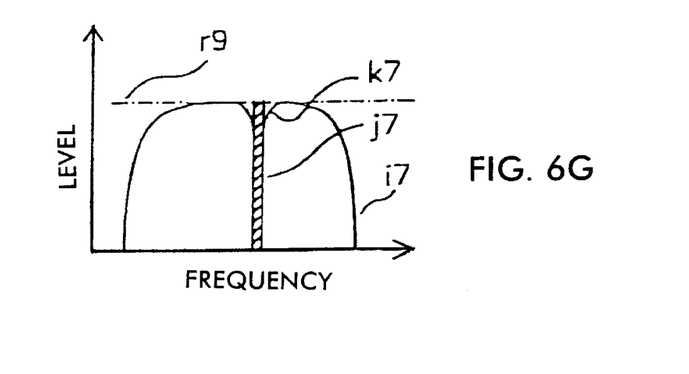
FIG. 6(g) illustrates the signal output from the magnetostatic filter 40.

The signal output from the variable amplifier 39 is applied to the magnetostatic filter 40. If the signal includes a component whose level in the frequency domain is higher than the saturation level r9, then such a component is reduced to a level equal to the saturation level r9. FIG. 6(g) illustrates the spectrum of the signal output from the magnetostatic filter 40. As can be seen, the power level of the narrow-band interfering signal j7 is limited by the magnetostatic filter 40 to a level equal to the saturation level r9, and thus the power level of the narrow-band interfering signal j7 becomes equal to the level of the spread signal i7.

In the above operation, an incidental reduction k7 occurs in the spread signal i7. However, the incidental reduction k7 is small enough because the amount of power reduction of the narrow-band interfering signal j7 performed by the magnetostatic filter 40 is further smaller than the amount of the power reduction performed by the magnetostatic filter 38.

The signal output from the magnetostatic filter 40 and input to the mixer 7 is converted in frequency such that the resultant frequency becomes equal to the difference between the original frequency and the frequency of the local signal supplied from the local oscillator 6.

In the spread spectrum communication device 30 having the structure described above, the saturation levels r7, r8, and r9 of three magnetostatic filters 36, 38, and 40 and the amplification factors of three variable amplifiers 35, 37, and 39 are selected such that the level of the narrow-band interfering signal is finally equal to the level of the spread signal. However, in the present embodiment, unlike the narrow-band interference signal elimination circuit 21 according to the previous embodiment described above with reference to FIG. 3, the level of the narrow-band interfering signal can be limited to an optimum value using all three magnetostatic filters regardless of the difference in level between the input spread signal and the maximum narrow-band interfering signal. That is, in the case of the narrow-band interference signal elimination circuit 21, when the maximum level of the narrow-band interfering signal is very high compared to the level of the spread signal, the amount of the power level reduction of the narrow-band interfering signal performed by the magnetostatic filter 25 at the first stage is greater than the amount of the power level reduction performed by the magnetostatic filter 27 or 29 at the second or third stage. Conversely, when the level of the narrow-band interfering signal is low, the amount of the power reduction performed by the magnetostatic filter 25 at the first stage can become very small. In contrast, in the narrow-band interference signal elimination circuit 31, the amounts of the power reductions performed by the respective magnetostatic filters are determined properly by the calculation so that the power level reduction of the narrow-band interfering signal is performed by an optimum amount at each magnetostatic filter.

As described above, it is possible to limit the narrow-band interfering signal contained in the spread signal to a particular level while maintaining the incidental reduction in the spread signal to a sufficiently low degree thereby achieving an improvement in the signal-to-noise ratio associated with the demodulated signal. Furthermore, it is possible to limit the narrow-band interfering signal across the entire frequency band of the spread signal using only one magnetostatic filter, and thus it is possible to realize a small-sized narrow-band interference signal elimination circuit.

In the specific embodiment described above with reference to FIG. 5, three magnetostatic filters are employed. However, the advantages and features of the invention may also be achieved by employing two or more magnetostatic filters. Furthermore, although in the above embodiment, the level of the narrow-band interfering signal is limited to the same value as the level of the spread signal, it may also be limited to a value higher or lower than the level of the spread signal.

Figure 7:
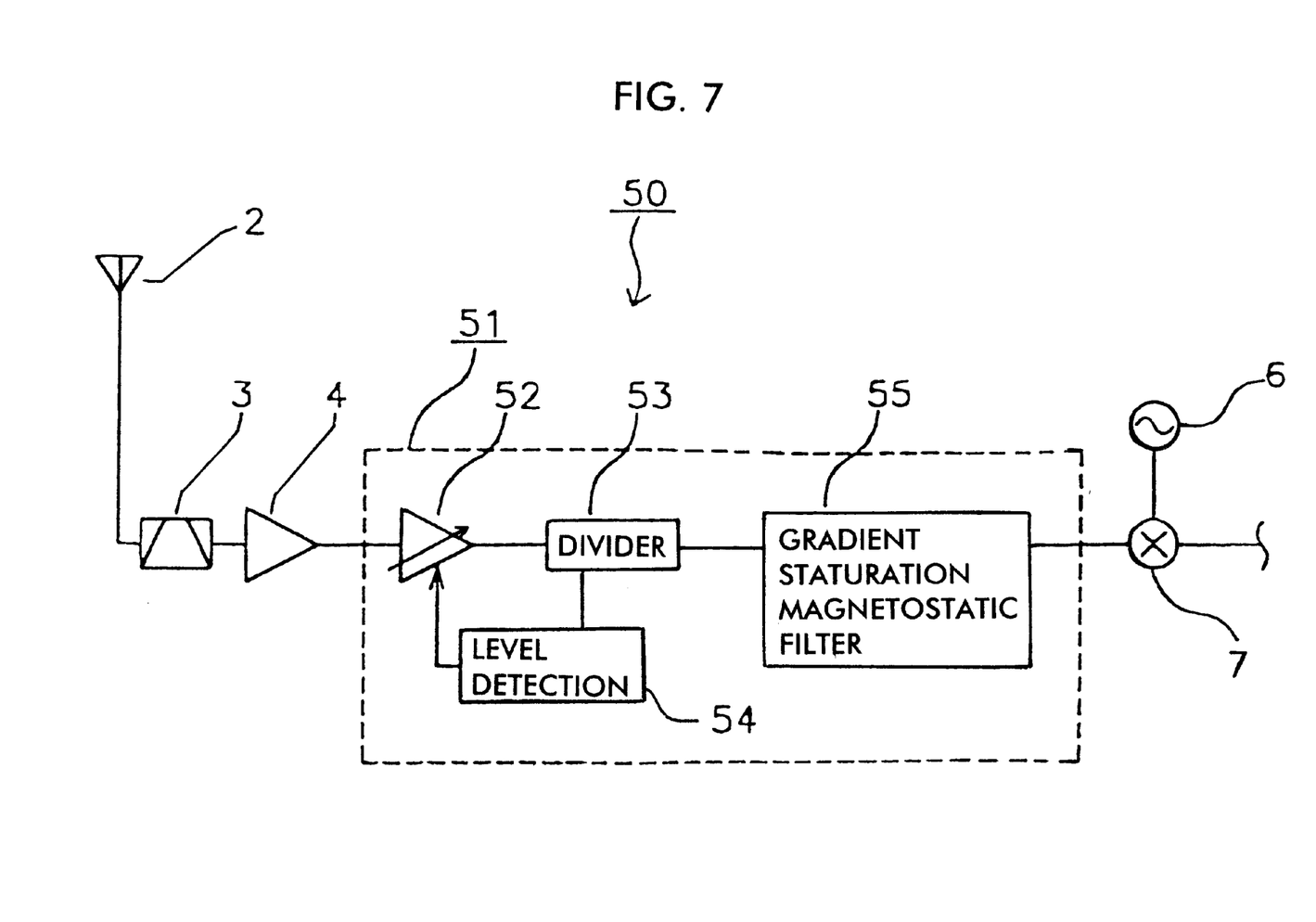
FIG. 7 is a block diagram illustrating the construction of a spread spectrum communication device according to still another embodiment of the present invention.

FIG. 7 illustrates still another embodiment of a spread spectrum communication device according to the present invention. In FIG. 7, elements similar or equivalent to those in the embodiment shown in FIG. 1 are denoted by similar reference numerals, and they are not described in further detail here. In the spread spectrum communication device 50 shown in FIG. 7, a narrow-band interference signal elimination circuit 51 comprises a variable amplifier 52, a divider 53, a level detection circuit 54, and a gradient saturation magnetostatic filter 55.

In the narrow-band interference signal elimination circuit 51, the input is applied to the divider 53 via the variable amplifier 52. One of the outputs of the divider 53 is connected to the output terminal via the gradient saturation magnetostatic filter 55, and the other output is connected to the variable amplifier 52 via the level detection circuit 54.

Figure 8:
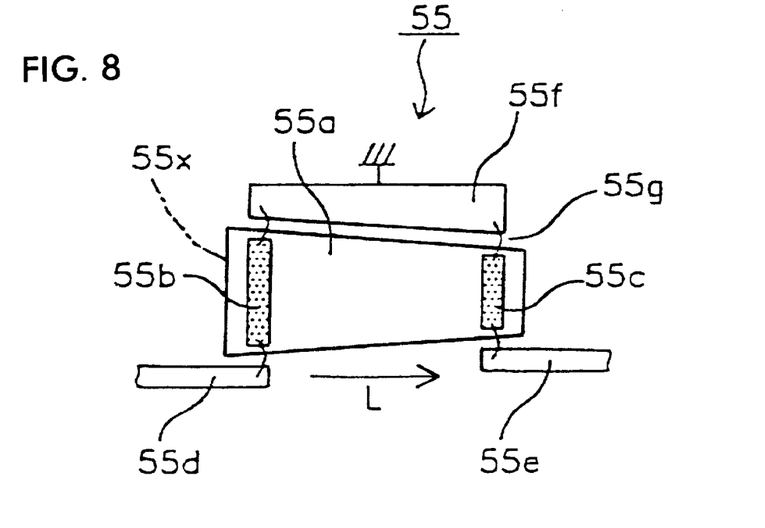
FIG. 8 is a top view of the gradient saturation magnetostatic filter used in the embodiment shown in FIG. 7.

Referring to FIG. 8, the construction of the gradient saturation magnetostatic filter 55 is described below. As shown in FIG. 8, the gradient saturation magnetostatic filter 55 comprises: a YIG (yttrium iron garnet) film 55a formed on a GGG (gadolinium gallium garnet) substrate 55x; an input transducer 55b and an output transducer formed on the YIG film 55a; an input signal terminal 55d; an output signal terminal 55e; a ground terminal 55f; and bonding wires 55g. The width of the YIG film 55a decreases from the maximum width at the location where the input transducer 55b is formed to the minimum width at the location where the output transducer is formed. The input transducer 55b and the output transducer 55c are connected to the input signal terminal 55d and the output signal terminal 55e, receptively, via the bonding wires 55g. In FIG. 8, L denotes the distance and the direction in which magnetostatic waves propagate in the YIG film 55a.

In the gradient saturation magnetostatic filter 55 having the structure described above, an electric signal input via the input signal terminal 55d is converted by the input transducer 55b to a magnetostatic wave, and propagates in the YIG film 55a toward the output transducer 55c. The magnetostatic wave is again converted by the output transducer 55c into an electric signal, and is output via the output signal terminal 55e.

Figure 9:
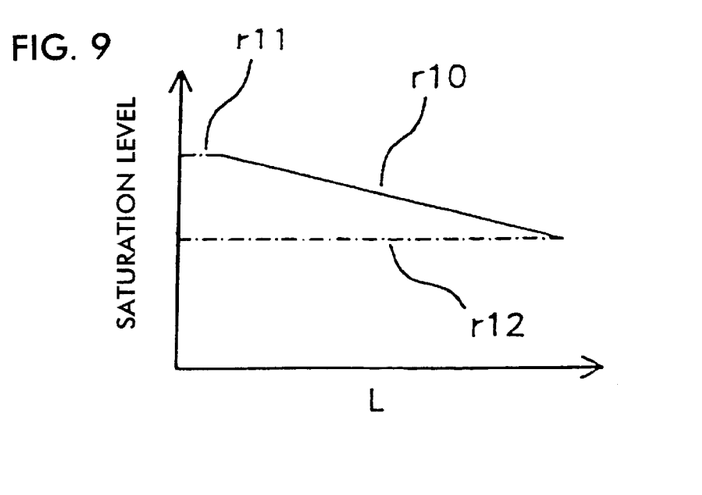
FIG. 9 is a graph illustrating the saturation level of the gradient saturation magnetostatic filter shown in FIG. 8 as a function of the position of a magnetostatic wave in the propagation direction.

FIG. 9 illustrates the saturation characteristic of the gradient saturation magnetostatic filter 55 shown in FIG. 8. In FIG. 9, the horizontal axis represents the direction (distance) L in which the magnetostatic wave propagates, and the vertical axis represents the saturation level. The saturation level r10 of the gradient saturation magnetostatic filter 55 decreases with the propagation of the magnetostatic wave from the saturation level r11 at the location of the input transducer 55b to the saturation level r12 at the location of the output transducer 55c. As a result, signal components higher than the saturation level r12 are successively limited to the saturation level r12 as the magnetostatic wave propagates along the YIG film 55a. Therefore, the amount of incidental reduction of the spread signal can be significantly reduced.

Figure 10:
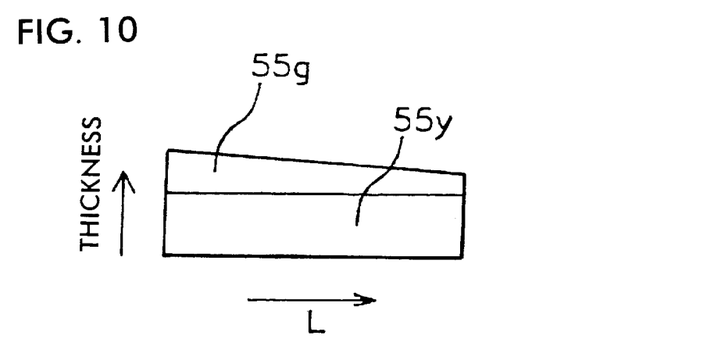
FIG. 10 is a side view of a gradient saturation magnetostatic filter having another structure.

FIG. 10 illustrates another embodiment of a gradient saturation magnetostatic filter. In the side view of FIG. 10, there are shown only a GGG substrate 55y and a YIG film 55g formed thereon, and the other elements are not shown. As shown in FIG. 10, the YIG film 55g gradually decreases in thickness in the direction in which the magnetostatic wave propagates. In this structure according to the present embodiment, both the GGG substrate 55y and the YIG film 55g have a fixed width. If the YIG film is formed in the manner described above, the resultant gradient saturation magnetostatic filter has a characteristic similar to that of the gradient saturation magnetostatic filter 55 shown in FIG. 8.

Figure 11A:
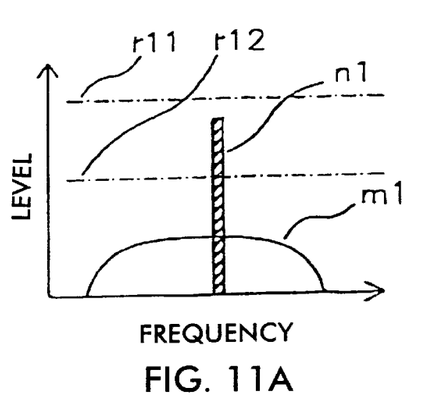
FIG. 11(a) illustrates the signal input to the narrow-band interference signal elimination circuit 51.
Figure 11B:
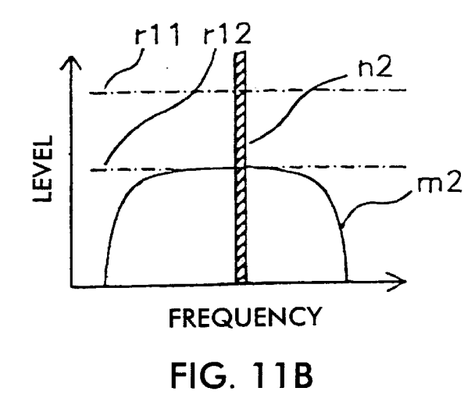
FIG. 11(b) illustrates the signal input to the gradient saturation magnetostatic filter 55.
Figure 11C:
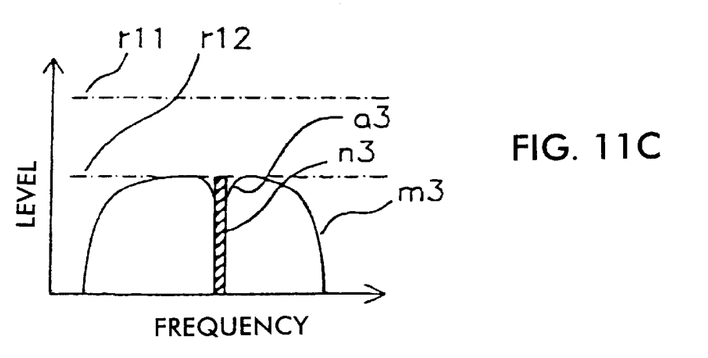
FIG. 11(c) illustrates the signal output from the gradient saturation magnetostatic filter 55.

Referring to FIGS. 7 and 11(a)–11(c), the operation of the spread spectrum communication device 50 is described below. FIGS. 11(a)–11(c) illustrate the spectrum of the spread signal and the spectrum of the narrow-band interfering signal contained in the spread signal, for various blocks of the device.

In FIG. 7, the spread signal received via the antenna 2 and containing the narrow-band interfering signal is applied to the bandpass filter 3 so as to remove unnecessary frequency components. The resultant signal is amplified by the amplifier 4 by a fixed amplification factor, and then applied to the narrow-band interference signal elimination circuit 51. FIG. 11(a) illustrates the spectrum of the signal input to the narrow-band interference signal elimination circuit 51. As shown in FIG. 11a, the signal applied to the narrow-band interference signal elimination circuit 51 includes a spread signal ml having a frequency component spread across a wide frequency band and also a narrow-band interfering signal n1 having a signal level higher than that of the spread signal ml and having a frequency component within the same frequency band. In FIGS. 11(a)–11(c), r11 and r12 denote the maximum and minimum saturation levels, respectively, of the gradient saturation magnetostatic filter 55.

The signal applied to the narrow-band interference signal elimination circuit 51 is amplified by the variable amplifier 52. The output of the variable amplifier 52 is divided by the divider 53 into two signals one of which is applied to the gradient saturation magnetostatic filter 55 while the other is applied to the level detection circuit 54. The level detection circuit 54 detects the level of the spread signal from the input signal, and controls the variable amplifier 52 so that the level of the spread signal m2 applied to the gradient saturation magnetostatic filter 55 becomes equal to the level r12 of the minimum saturation level of the gradient saturation magnetostatic filter 55. FIG. 11(b) illustrates the spectrum of the signal input to the gradient saturation magnetostatic filter 55. As can be seen, the magnification factor of the variable amplifier 52 is controlled so that the level of the spread signal m2 becomes equal to the minimum saturation level r12 of the gradient saturation magnetostatic filter 55. The narrow-band interfering signal n2 contained in the spread signal m2 is also amplified by the same amplification factor, and thus the level of the narrow-band interfering signal n2 becomes greater than the maximum saturation level r11 of the gradient saturation magnetostatic filter 55.

The narrow-band interfering signal contained in the signal applied to the gradient saturation magnetostatic filter 55 is limited in the order from higher to lower levels successively as the magnetostatic wave propagates along the YIG film, and finally limited to a level equal to the level of the spread signal. FIG. 11(c) illustrates the spectrum of the signal output from the gradient saturation magnetostatic filter 55. As shown in FIG. 11(c), the level of the narrow-band interfering signal n3 becomes equal to the level of the spread signal m3.

In the above operation, an incidental reduction occurs in the spread signal m3. However, in this gradient saturation magnetostatic filter 55, the incidental reduction in the spread signal is not very great because the reduction of the narrow-band interfering signal is performed gradually.

The signal output from the gradient saturation magnetostatic filter 55 is applied to the mixer 7. The mixer 7 converts the received signal to a signal having a frequency equal to the difference between the original frequency and the frequency of the local signal supplied from the local oscillator. The resultant signal is supplied to a demodulator (not shown).

As described above, it is possible to limit the narrow-band interfering signal contained in the spread signal to a particular level while maintaining the incidental reduction to a sufficiently low degree thereby achieving an improvement in the signal-to-noise ratio associated with the demodulated signal. Furthermore, it is possible to limit the narrow-band interfering signal across the entire frequency band of the spread signal using only one magnetostatic filter, and thus it is possible to realize a small-sized narrow-band interference signal elimination circuit.

Although in the embodiment described above with reference to FIG. 7, the level of the narrow-band interfering signal is limited to the same value as the level of the spread signal, it may also be limited to a value higher or lower than the level of the spread signal.

As can be understood from the above description, the spread spectrum communication device according to the present invention has the following advantages. That is, when the spread signal includes a narrow-band interfering signal having a level in the frequency domain higher than the predetermined value, the level of the narrow-band interfering signal is limited to a value equal to the level of the spread signal thereby achieving an improved signal-to-noise ratio in the demodulated signal. The incidental reduction in the spread signal can be minimized by performing the operation of limiting the narrow-band interfering signal in a step-by-step fashion or a gradual fashion. Because the power level is limited in the frequency domain, a wide band operation is possible. Even when a plurality of narrow-band interfering signals having a different frequency are present within the frequency band of the spread signal, it is possible to simultaneously limit all the narrow-band interfering signals.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in a frequency domain, said spread spectrum communication device being characterized in that
    said narrow-band interference signal elimination circuit limits a level of said narrow-band interfering signal a plurality of times thereby successively limiting the level in the frequency domain.

2. A spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in a frequency domain said spread spectrum communication device being characterized in that
    said narrow-band interference signal elimination circuit limits a level of said narrow-band interfering signal a plurality of times thereby successively limiting the level in the frequency domain, said narrow-band interference signal elimination circuit including a magnetostatic filter for limiting the level of a signal whose level in the frequency domain is higher than a predetermined level.

3. A spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in a frequency domain, said spread spectrum communication device being characterized in that said narrow-band interference signal elimination circuit limits a level of said narrow-band interfering signal a plurality of times thereby successively limiting the level in the frequency domain, said narrow-band interference signal elimination circuit including:

a plurality of magnetostatic filters connected in series in such a manner that the saturation level thereof decreases with the position of the magnetostatic filters in the series connection.

4. A spread spectrum communication device according to claim 3, including a variable amplifier for amplifying the level of said spread signal input to said plurality of magnetostatic filters.

5. A spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in a frequency domain, said spread spectrum communication device being characterized in that said narrow-band interference signal elimination circuit limits a level of said narrow-band interfering, signal a plurality of times thereby successively limiting the level in the frequency domain, said narrow-band interference signal elimination circuit including:

a plurality of magnetostatic filters connected in series;

a plurality of amplifiers respectively disposed between adjacent magnetostatic filters; and a variable amplifier for amplifying the level of said spread signal input to said plurality of magnetostatic filters.

6. A spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in a frequency domain, said spread spectrum communication device being characterized in that said narrow-band interference signal elimination circuit limits a level of said narrow-band interfering signal a plurality of times thereby successively limiting the level in the frequency domain said narrow-band interference signal elimination circuit including:

a plurality of magnetostatic filters connected in series;

a plurality of variable amplifiers each disposed at an input of a respective one of the magnetostatic filters;

a level detection circuit for detecting the level of said spread signal and also the maximum level of said narrow-band interfering signal contained in said spread signal; and an amplification factor control circuit connected to said level detection circuit and serving to control an amplification factor of said plurality of variable amplifiers.

7. A spread spectrum communication device including signal receiving means for receiving a spread signal having a spread spectrum and also including a narrow-band interference signal elimination circuit for removing a narrow-band interfering signal contained in the spread signal received via the signal receiving means and having a level higher than a predetermined value in the frequency domain, said spread spectrum communication device being characterized in that said narrow-band interference signal elimination circuit includes: a gradient saturation magnetostatic filter whose saturation level decreases with the propagation of the signal; and a variable amplifier for amplifying the level of said spread signal input to said gradient saturation magnetostatic filter.

8. A spread-spectrum signal processing device comprising:

an input for receiving a spread input signal;

a first magnetostatic wave filter connected to said input;

a second magnetostatic wave filter connected to said first magnetostatic wave filter, the second magnetostatic wave filter having a saturation level lower than a saturation level of the first magnetostatic wave filter;

a detector for detecting a level of the spread input signal;

an amplifier for adjusting the level of the spread input signal.

9. A spread-spectrum signal processing device according to claim 8, wherein said amplifier adjusts the level of the spread input signal to a level lower than the saturation level of the first magnetostatic wave filter.

10. A spread-spectrum signal processing device according to claim 8 further comprising:

at least one magnetostatic wave filter successively connected to said second magnetostatic wave filter so that saturation levels of the respective at least one and second magnetostatic wave filters decrease in order.

11. A method of processing a spread signal comprising:

filtering the spread signal by a first magnetostatic wave filter having a first saturation level; and filtering the spread signal by a second magnetostatic wave filter having a second saturation level lower than the first saturation level of the first magnetostatic wave filter.

12. A method of processing a spread signal according to claim 11, wherein saturation levels of the first and second magnetostatic wave filters are substantially the same or higher than a maximum level of the spread signal.

13. A method of processing a spread signal according to claim 11, wherein said spread signal is amplified before being filtered by said first and second magnetostatic wave filters.

14. A method of processing a spread signal having a spread spectrum and also including a narrow band interference signal, which method comprises limiting a level of said narrow-band interfering signal a plurality of times to thereby successively limit the level in the frequency domain.

15. A method of processing a spread signal having a spread spectrum and also including a narrow band interference signal, which method comprises limiting a level of said narrow-band interfering signal a plurality of times with a narrow-band elimination circuit including a magnetostatic filter.

16. A method of processing a spread signal having a spread spectrum and also including a narrow band interference signal, which method comprises limiting a level of said narrow-band interfering signal a plurality of times with a narrow-band elimination circuit including a gradient saturation magnetostatic filter whose saturation level decreases with the propagation of the signal.

* * * * *